Oct. 8, 1968 M. E. GABRIEL 3,405,313
TELEVISION DEFLECTION APPARATUS
Filed Dec. 27, 1966
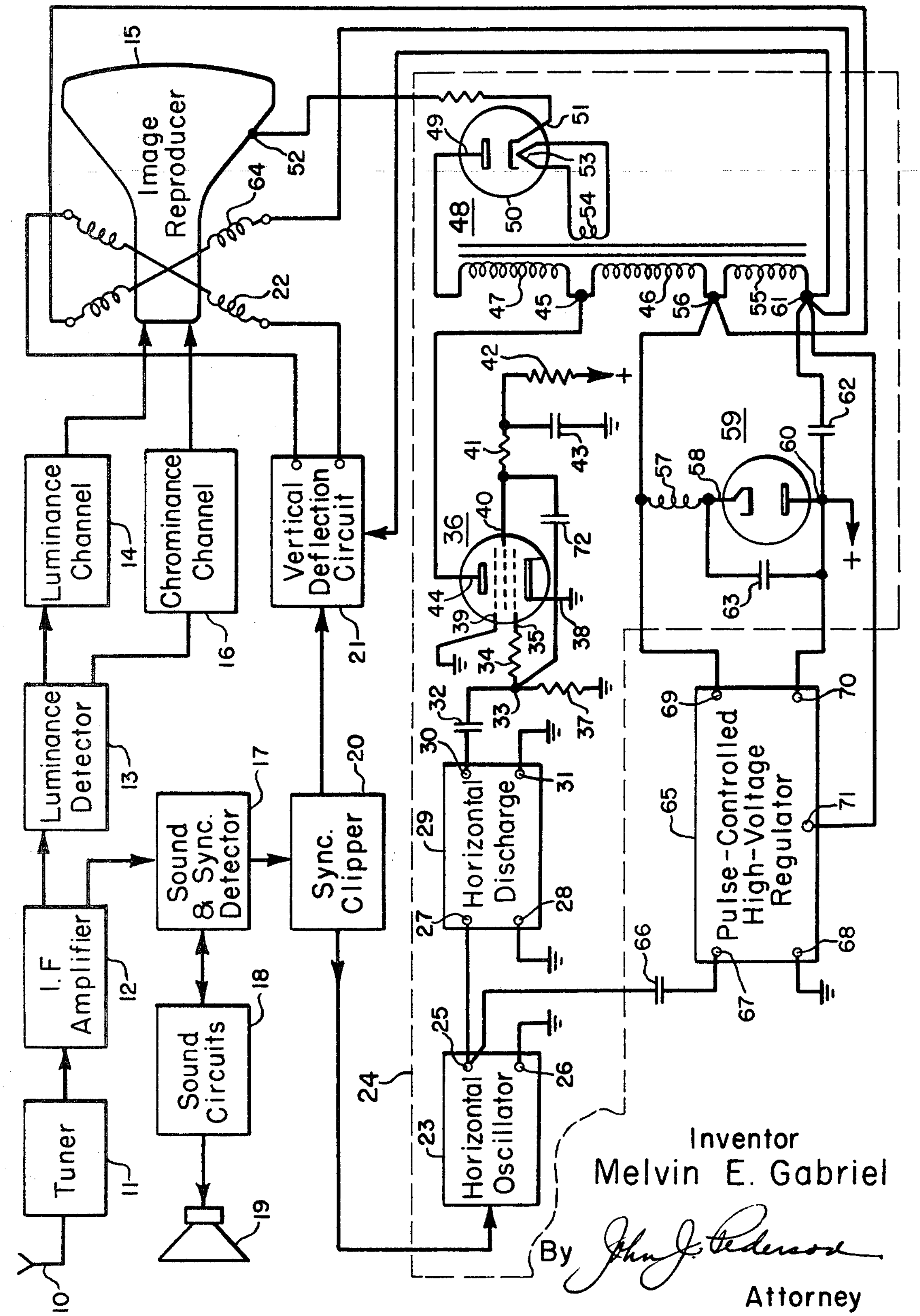
Inventor
Melvin E. Gabriel
By
Attorney

United States Patent Office 3,405,313
Patented Oct. 8, 1968

3,405,313

TELEVISION DEFLECTION APPARATUS

Melvin E. Gabriel, Niles, Ill., assignor to Zenith Radio Corporation, Chicago, Ill., a corporation of Delaware

Filed Dec. 27, 1966, Ser. No. 604,772
9 Claims. (Cl. 315—27)

The present invention relates to improvements in television receivers, and, more particularly, to a new and improved horizontal deflection system for the cathode-ray tube of a television receiver.

In present-day television receivers the televised image is reproduced by scanning an electron beam horizontally and vertically across the screen of a cathode-ray tube type image reproducer in response to applied sawtooth deflection signals. Horizontal sawtooth deflection signals in such receivers are commonly generated by a deflection circuit employing a deflection amplifier device, or horizontal output tube, having an anode circuit which includes the deflection winding of the image reproducer. An appropriate driving waveform is applied to the control grid of this tube so that anode conduction occurs therein only during the latter half of each line scanning cycle. At the conclusion of each line scan, when the horizontal output tube is drawing heavy current, the applied waveform causes the tube to be driven sharply into cut-off, resulting in the generation of harmonic oscillations at approximately 95 kHz. in the horiontal deflection winding. These oscillations are utilized in a manner well known to the art to return or retrace the electron beam to its initial position before the beginning of the next line scanning cycle.

As we have seen, the horizontal output tube draws heavy current toward the end of each line scanning cycle, at which time it is driven rapidly into cut-off to accomplish horizontal retrace of the electron scanning beam. As a result, the horizontal output tube is subjected to rapid fluctuations in applied voltage varying over a range of many thousands of volts. Such rapid voltage fluctuations often result in the production of undesirable Barkhausen oscillations within the structure of the tube. These oscillations, generally centered about 60 mHz., radiate into the radio frequency (RF) stages of the television receiver and may appear at one or more positions in the reproduced picture as thin vertical lines, or other vertical displays commonly referred to as snivets. Furthermore, this radiation, because of its time coincidence with received horizontal synchronizing pulses, often interferes with proper operation of the receiver synchronizing circuits. With the advent of ultra-high-frequency (UHF) television broadcasts, which have a substantially wider range of frequencies than very-high-frequency (VHF) broadcasts, there is an even greater possibility of such interference.

Prior-art snivet reduction attempts have generally relied on the use of a combination of capacitors, resistors and inductances for preventing radiation from the individual elements of the horizontal output tube at snivet frequencies. Such circuits, besides being generally ineffective, have been costly. One particular prior art circuit for reducing snivets required that the suppressor electrode of the horizontal output tube be operated at a positive potential with respect to the cathode electrode of that device. This circuit, which necessitated the addition of at least two resistors and a capacitor, was unduly expensive and did not achieve the desired amount of snivet reduction.

Accordingly, it is an object of the present invention to provide a new and improved horizontal deflection system for use in conjunction with the image reproducer of a television receiver.

It is a more specific object of the invention to provide a horizontal deflection system for a television receiver which is substantially free of Barkhausen oscillations.

It is another object of the present invention to provide new and improved circuitry for eliminating snivets from the reproduced image of a television receiver.

The invention is directed to a deflection system for generating a sawtooth scanning current in the deflection windings of a cathode-ray tube image reproducer. The system comprises an electron-discharge amplifier device having at least a cathode, a control grid, a screen grid and an anode. A reactive load circuit, which includes the deflection winding, is connected to the anode. Means are included for rendering the electron-discharge amplifier device nonconducting during each retrace period and conducting during the latter portion of each horizontal scan period. Further included are means, comprising a capacitor coupled between the control grid and the screen grid, for inhibiting the production of snivets in the image reproduced by the receiver.

These and other objects and advantages of the present invention may best be understood by referring to the accompanying drawing which is a combination block and schematic diagram of a television receiver having a horizontal deflection system constructed in accordance with a preferred embodiment of the present invention.

The color television receiver illustrated in the figure comprises an antenna 10 coupled in a conventional manner to a tuner 11, which includes the usual radio frequency amplifying and heterodyning stages. The intermediate-frequency output of tuner 11 is coupled to an intermediate-frequency amplifier 12, which, in turn, is coupled to a luminance detector 13. One video-frequency output of luminance detector 13 is applied to a luminance channel 14, wherein it is amplified before application to image reproducer 15, which in this case is a standard three-gun shadow-mask tricolor cathode-ray tube. The other output of luminance detector 13 is coupled to a chrominance channel 16 which includes appropriate color demodulation and amplification circuitry for generating color-difference signals suitable for application to color image reproducer 15. The output of intermediate-frequency amplifier 12 is further coupled to a sound and sync detector 17, the output of which is applied through conventional sound circuits 18 to a speaker 19. The output of detector 17 is also coupled to a sync clipper 20 wherein synchronizing information in the form of vertical and horizontal sync pulses is derived from the received signal. The vertical sync pulses are coupled to vertical deflection circuit 21 wherein a synchronized vertical-rate sawtooth scanning signal is developed for application to the vertical deflection windings 22 of image reproducer 15.

Horizontal sync pulses from sync clipper 20 are also coupled to a horizontal oscillator 23 which comprises part of the receiver horizontal deflection system 24 and includes appropriate oscillator and reactance control circuitry for generating a synchronized horizontal-rate wave signal at output terminals 25 and 26. The synchronized wave signal is applied directly to the input terminals 27 and 28 of a horizontal discharge stage 29, terminals 25 and 27 being connected together and terminals 26 and 28 being grounded. Horizontal discharge stage 29 conditions and amplifies the applied horizontal-rate wave signal to develop a drive signal across output terminals 30 and 31. Terminal 31 is grounded and terminal 30 is connected by a coupling capacitor 32 to a juncture 33 and from there by an isolation resistor 34 to the control electrode 35 of a deflection amplifier device 36. Juncture 33 is connected to ground by a resistor 37, and the cathode and suppressor electrodes, 38 and 39, respectively, of device 36 are grounded. The screen electrode 40 of device 36 is connected by the series combination of an isolation resistor 41 and a screen dropping resistor 42 to a source of positive unidirectional current. The juncture of resistors 41 and 42 is bypassed to ground as to 15 kHz. signals by a capacitor 43 and a capacitor 72 is connected from screen grid 40 to juncture 33.

The anode 44 of device 36 is connected to a juncture 45 formed by one terminal of the primary winding 46 and one terminal of the tertiary winding 47 of sweep transformer 48. The remaining terminal of tertiary winding 47 is connected to the anode 49 of a high voltage rectifier 50. The cathode 51 of rectifier 50 is connected to the ultor electrode 52 of image reproducer 15 and the filament 53 is connected across a winding 54 of sweep transformer 48.

The remaining terminal of primary winding 46 is connected to one terminal of a secondary winding 55 at a juncture 56. Juncture 56 is connected through an inductance 57 to the cathode 58 of a diode device 59, the conventional damper diode. Anode 60 of device 59 is connected to a positive unidirectional source and to the remaining terminal of secondary winding 55, juncture 61, by a capacitor 62.

A capacitor 63 is connected between the cathode 58 and the anode 60 of device 59. The horizontal deflection winding 64 of image reproducer 15 is shunt-connected across secondary winding 55, and juncture 61, which comprises a source of boost potential for the receiver, is connected to vertical deflection circuits 21 for which it serves as a source of unidirectional operating potential in a manner well known to the art.

The receiver further includes a pulse-controlled high-voltage regulator 65 which preferably is identical to the system claimed and described in the copending application of Stanley Bart, Ser. No. 467,466, now U.S. Patent No. 3,371,207, assigned to the present assignee. The horizontal-rate wave signal generated by horizontal oscillator 23 is coupled by a capacitor 66 to one gating input terminal 67 of pulse-controlled regulator stage 65 and the other gating input terminal 68 is grounded. Regulator 65 has a pair of output terminals 69 and 70 connected across secondary winding 55 of sweep transformer 48. The control terminal 71 of regulator 65 is connected to juncture 61.

With the exception of certain detailed circuitry of horizontal deflection system 24, the receiver is conventional in design, and accordingly only a brief description of its operation need be given here. A received signal is intercepted by antenna 10, then amplified and translated to an intermediate-frequency by tuner 11. After amplification by intermediate-frequency amplifier 12, the signal is translated to a composite video-frequency signal by luminance detector 13. The luminance component of the translated composite signal, which represents brightness information in the televised image, is amplified in luminance channel 14 and applied to image reproducer 15. The chrominance component, after demodulation and amplification in chrominance channel 16, is applied in the form of color-difference signals to image reproducer 15. The concurrently applied luminance and color-difference signals matrix in image reproducer 15 to produce an image having brightness, hue and color saturation characteristics corresponding to the televised image. The amplified intermediate-frequency signal from intermediate-frequency amplifier 12 is also applied to sound and sync detector 17, wherein a composite video-frequency signal is derived which includes sound and synchronizing components. The sound components of this composite signal are applied to sound circuits 18, wherein conventional sound demodulation and amplification circuitry is utilized to develop an audio output signal for application to speaker 19.

Synchronizing information, in the form of horizontal and vertical sync pulses, is separated from the composite signal by sync clipper 20. Vertical deflection circuit 21 utilizes the vertical sync pulses to generate a synchronized vertical-rate sawtooth scanning signal in vertical deflection winding 22. As has become common practice, vertical deflection circuit 21 makes use of the boost supply of the receiver as a source of positive unidirectional current. Horizontal sync pulses from sync clipper 20 are applied to horizontal oscillator stage 23, part of the receiver horizontal deflection system 24. This stage includes a sine-wave oscillator and appropriate reactance control circuitry for producing at output terminals 25 and 26 a horizontal-rate wave signal synchronized to the received television transmission. Horizontal discharge stage 29 amplifies and conditions the horizontal-rate wave signal to develop a drive signal at output terminals 30 and 31 which resembles a sawtooth during scan intervals and a steep negative-polarity pulse during retrace intervals. This drive signal is coupled by capacitor 32 and isolation resistor 34 to control grid 35 of device 36. Resistor 37 provides a direct-current path to ground for grid 35. Device 36 is energized by a positive unidirectional source through an output circuit which serially comprises primary winding 46, inductance 57, and diode 59. Resistor 42 serves as a conventional screen-dropping resistor for screen electrode 40 and capacitor 43 is a conventional screen bypass capacitor. Resistors 34 and 41 serve as isolation resistors for electrodes 35 and 40, respectively.

In its general aspects, the operation of horizontal deflection system 24 is well known to the art. The drive signal applied to control electrode 35 initiates conduction in device 36 at approximately the middle of the horizontal scanning cycle, and causes a linear increase in current until a maximum is reached immediately prior to the beginning of the retrace interval in the received television transmission. As the current in device 36 increases, the current in transformer windings 46 and 55 and deflection winding 64 increases, causing the electron beam to be deflected towards the right edge of the raster. When the current through deflection winding 63 has reached a maximum corresponding to the end of the horizontal scanning cycle, the drive signal applied to control grid 35 suddenly becomes negative and device 36 is driven sharply into cut-off. The sudden termination of current flow through winding 46 causes the magnetic fields surrounding secondary winding 55 and deflection winding 64 to collapse. This initiates a harmonic oscillation of approximately 95 kHz. in the equivalent tuned circuit consisting of deflection winding 64, transformer winding 55, capacitors 62 and 63 and the distributed stray and fixed capacities of the deflection circuit.

The current through deflection winding 64 reverses during the first quarter cycle of the induced oscillation and rises to a maximum in the reverse direction at the end of the second quarter cycle of oscillation. This rapid reversal of current flow through deflection winding 64 constitutes the fly-back or retrace interval during which the scanning beam of image reproducer 15 is rapidly returned from the right edge to the left edge of the raster. The counter EMF developed across deflection winding 64 during the first portion of retrace is applied to diode 59 through inductance 57 and capacitor 62. During retrace this potential renders the cathode 58 of device 59 positive with respect to its anode 60, so that device 59 does not conduct and has no damping effect on the oscillation. At the end of the first half-cycle of oscillation, however, the potential applied to device 59 is reversed and diode 59 conducts, damping out subsequent oscillations in deflection winding 64 and causing a linearly decaying current through deflection winding 64. This sweeps the electron scanning beam from the left side to the center of the raster, at which point device 36 again becomes conductive to complete the scanning cycle.

The sudden termintion of current flow at the beginning of the retrace interval also generates a harmonic oscillation in high voltage tertiary winding 47. This oscillation is peak-rectified by high voltage rectifier 50 which, in conjunction with the internal filtering capacity of image reproducer 15, develops an accelerating potential of approximately 25,000 volts at ultor electrode 52. Winding 54 is included for energizing the heater 53 of high-voltage rectifier 50.

Regulator system 65 accomplishes regulation of the accelerating potential applied to image reproducer 15 by variably loading tertiary winding 47 during the first quarter cycle of the harmonic oscillation induced in that winding. The effect of increased loading is to reduce the amplitude of the initial high voltage pulse at the beginning of retrace, which in turn reduces the potential at ultor electrode 52. To avoid the electrical insulation problems associated with the high potential appearing on tertiary winding 47, the regulator system is not connected directly across this winding but rather across secondary winding 55, and the mutual inductance between the two windings is relied upon to transfer the loading effect.

The degree of loading imposed by regulator 65 is directly dependent on the magnitude of the control potential applied to control electrode 71 which, in turn, is dependent on the boost potential developed at juncture 61. Since the boost potential is directly related to the accelerating potential applied to the ultor electrode 52 of image reproducer 15, by varying the loading effect of regulator 65 in response to this potential it is possible to maintain the accelerating potential on image reproducer 15 substantially constant. To prevent regulator 65 from adversely affecting the width of the reproducer image, the horizontal-rate wave signal generated by horizontal oscillator 23 is applied by capacitor 66 to gating terminals 67 and 68 of pulse controlled regulator 65. This horizontal-rate wave-signal acts as a gating control signal which allows regulator 65 to load winding 55 only during a small portion of the first half of the retrace interval. Of course, the amount of loading offered by device 65 during this period remains dependent on the control potential supplied to control terminal 51, which in turn is dependent on the accelerating potential applied to image reproducer 15.

It will be recalled that at the beginning of the retrace interval the drive signal applied to device 36 causes the current in that device to be suddenly cut off. During the second quarter cycle of the ensuing harmonic oscillation in sweep transformer 48, anode 44 becomes highly negative with respect to screen grid 40, which is connected to a constant positive unidirectional source. It is believed that this condition causes the electrons trapped between these two tube elements to be set into oscillation, resulting in what have come to be known as Barkhausen oscillations. Such oscillations, in the neighborhood of 60 mHz. and higher, would, if not attenuated, be radiated by the circuitry associated with device 36 to other parts of the television receiver. This would result in the production of snivets, or thin vertical lines appearing on the screen of image reproducer 15, and possibly in degradation of the synchronizing ability of the receiver horizontal deflection circuits.

In accordance with the invention, Barkhausen oscillations are attenuated in deflection system 24 by capacitor 72, which has a value of less than 1000 pf. and is believed to operate much like a partial bypass capacitor at snivet frequencies to effectively neutralize or cancel out the radiating effect of screen grid 40. Although capacitor 72 has proven most effective in this respect when connected between junction 33 and screen grid 40, as shown in the present embodiment, it will be appreciated that the same effect can be obtained by other connections, as between grids 35 and 40 or between the juncture of resistors 41 and 42 and grid 35.

In addition to its bypassing function, capacitor 72 is believed to introduce degenerative feedback between screen grid 40 and control grid 35 during the latter two-thirds of each horizontal line scan. It will be recalled that during retrace a harmonic oscillation of approximately 95 kHz. exists in the various windings of horizontal sweep transformer 48. Although damper diode 59 effectively damps out the harmonic oscillations in secondary winding 55 and deflection winding 64, primary winding 46 nevertheless continues to oscillate heavily. This oscillation, coupled by the inter-electrode capacities of device 36 to screen electrode 40, has the undesirable effect of periodically changing the operating characteristics of device 36 in a manner which enhances the generation of snivets.

Furthermore, the periodic changes in the characteristics of device 36, synchronized as they are to the harmonic oscillations in sweep transformer 48, tend to reinforce the damped oscillation in secondary winding 55. This may cause damper diode 59 to be instantaneously driven into cut-off, causing the production of one or more vertical shadings commonly misnomered drive lines. Screen grid 40, which is maintained at a positive potential during the entire retrace interval, acts as an anode relative to cathode 38 and control grid 35. Capacitor 72 introduces inverse feedback to the triode amplifier thus formed, causing a reduction in the amplitude of the oscillations appearing on screen electrode 40 and a consequent reduction in snivets and drive lines.

An ancillary function of capacitor 72 is to shape the drive signal applied to control grid 35. Because screen grid 40 is effectively bypassed to ground at the 15 kHz. scanning frequency by capacitor 43, connecting capacitor 72 between this grid and control grid 35 has essentially the same effect as connecting a shunt capacity from juncture 33 to ground. This added capacity rounds off and increases the slope of the applied drive signal, which may be characterized as a shallow-slope ramp function during trace intervals and as a squared negative-polarity pulse of large amplitude during retrace intervals. This reshaping of the drive signal is beneficial to the operation of device 36 for two reasons. First, it lowers the anode current at the beginning of each line scan, which renders the voltage relationships less favorable to the generation of Barkhausen oscillations and thus reduces the likelihood of snivets being generated within device 36. Second, it increases the anode current during the latter part of each line scan, which tends to dampen the harmonic ringing oscillation on anode 44 and reduces the likelihood of drive lines being produced as a result of damper diode 59 being momentarily driven into cut-off.

The present circuit, which requires only a single low-cost capacitor (150 pf. at 500 volts in the present embodiment), offers greatly improved performance over prior-art snivet reduction techniques while achieving a substantial savings in cost. Of particular significance in the inventive circuit is the economy with which it can be incorporated in present-day television receivers. This is particularly important in the present high-volume low-profit-margin consumer television market, where any economy in component cost is likely to gain a valuable competitive advantage. Although the deflection system shown here is intended for use in conjunction with a three-gun shadow-mask tri-color cathode-ray tube, it will be appreciated that the itnvention also finds utility when used in conjunction with other types of image reproducers requiring reaction-scanning circuits, such as a conventional monochrome cathode-ray tube.

While a particular embodiment of the invention has been shown and described, it will be obvious to those skilled in the art that changes and modifications may be made without departing from the invention in its broader aspects. And, therefore, the aim of the appended claims is to cover all such changes and modifications as fall within the true spirit and scope of the invention.

I claim:

1. A horizontal deflection system for generating a sawtooth scanning current in the deflection windings of a cathode-ray tube image reproducer, comprising:

an electron-discharge amplifier device having at least a cathode, a control grid, a screen grid and an anode;

a reactive load circuit, including said deflection winding, coupled to said anode;

means for rendering said electron-discharge amplifier device nonconducting during each retrace period and conducting during the latter portion of each horizontal scan period; and means, comprising a capacitor coupled between said control grid and said screen grid, for inhibiting the production of snivets in the image reproduced by said receiver.

2. A deflection system as described in claim 1 wherein said reactive load circuit is inductive.

3. A deflection system as described in claim 1 wherein said capacitor is less than 1000 micromicrofarads.

4. In a television receiver, a horizontal deflection system for generating a sawtooth scanning current in the deflection windings of a cathode-ray tube image reproducer, comprising:

an electron-discharge amplifier device having at least a cathode, a control grid, a screen grid and an anode;

a reactive load circuit, including said deflection winding, coupled between said anode and a source of positive unidirectional current;

means for supplying a positive unidirectional operating voltage to said screen grid;

means for connecting said cathode to a plane of reference potential;

a source of horizontal-rate sawtooth drive signals;

means including an input circuit for applying said drive signals to said control grid for generating said scanning current in said deflection windings, said applied signals driving said amplifier device into cut-off for a substantial portion of the horizontal scanning interval during which the voltage on said anode is decreased below the voltage on said screen grid such that undesirable high frequency oscillations are produced within said amplifier device;

and means comprising a capacitor coupled between said screen grid and said control grid for at least partially bypassing said high frequency oscillations to materially reduce their amplitude and inhibit the production of snivets in the image reproduced by said receiver.

5. A deflection system as described in claim 4 wherein said reactive load circuit is inductive.

6. A deflection system as described in claim 4 wherein said capacitor is less than 1000 micromicrofarads.

7. In a television receiver, a horizontal deflection system for generating a sawtooth scanning current in the deflection windings of a cathode-ray tube image reproducer, comprising:

an electron-discharge amplifier device having at least a cathode, a control grid, a screen grid and an anode;

a reactive load circuit, including said deflection winding, connected between said anode and a source of positive unidirectional current;

means for supplying a positive unidirectional operating voltage to said screen grid;

means for returning said cathode to a plane of reference potential;

a source of horizontal-rate sawtooth drive signals comprising sawtooth voltage components during trace intervals and negative-polarity pulse voltage components during retrace intervals;

means including an input circuit for applying said drive signals to said control grid for generating said scanning current in said deflection windings, said applied signals driving said first amplifier device sharply into cut-off at the beginning of each retrace interval, thereby initiating a harmonic ringing oscillation in said reactive load circuit which is coupled to said screen grid through the internal anode-to-screen grid capacity of said amplifier device and causing the voltage on said anode to be reduced below the voltage on said screen grid during said retrace intervals and a portion of each of said trace intervals;

and inverse feedback means comprising a capacitor connected between said screen grid and said control grid for degeneratively applying a portion of said ringing oscillation to said control grid to reduce the amplitude of said ringing oscillation at said screen grid and thereby inhibit the production of snivets and drive lines in the image reproduced by said receiver.

8. A deflection system as described in claim 7 wherein said reactive load circuit is inductive.

9. A deflection system as described in claim 7 wherein said capacitor is less than 1000 micromicrofarads.

References Cited

UNITED STATES PATENTS

| | | | |
|---|---|---|---|
| 3,196,309 | 7/1965 | Liu | 315—27 |
| 2,944,186 | 7/1960 | Boekhorst et al. | 315—27 |
| 2,834,913 | 5/1958 | Dietch | 315—27 |

RODNEY D. BENNETT, *Primary Examiner.*

C. L. WHITHAM, *Assistant Examiner.*